United States Patent Office 3,364,283
Patented Jan. 16, 1968

3,364,283
POLYMERS OF VINYLIDENE CYANIDE AND AN UNSATURATED SULFONIC ACID AND BLENDS CONTAINING SAME
Stephen M. Davis, Elyria, Ohio, assignor to Celanese Corporation, a corporation of Delaware
No Drawing. Filed Sept. 11, 1961, Ser. No. 136,998
16 Claims. (Cl. 260—876)

The present invention relates to the production of novel polymeric compositions of improved dyeability.

In application Ser. No. 89,122, now U.S. Patent 3,180,857, issued Apr. 27, 1965, there is described a process for rendering polymers of vinylidene cyanide (methylene malononitrile) dyeable by incorporation of units of sulfonic acids, e.g. ethylenically unsaturated organic sulfonic acids including styrene sulfonic acids such as ortho-, meta- or para-styrene sulfonic acid as well as commercial mixtures thereof, ortho-, meta- or parasulfomethyl styrene, mixtures thereof, substitution products thereof such as poly-sulfo derivatives as well as β-sulfoethyl methacrylate (isothionic acid ester of methacrylic acid), as well a sulfonic acids wherein the sulfo group is less than three atoms removed from the ethylenic unsaturation, e.g. vinylsulfonic acid, allylsulfonic acid, methallyl sulfonic acid and the like.

While these modified vinylidene cyanide polymers exhibit improved dyeability it has been found that the dyeabilities of different batches are improved to different extents even through analyses indicate their monomer makeups to be the same.

It is accordingly an object of the present invention to impart to vinylidene cyanide polymers improved uniform dyeability.

Other objects and advantages will become apparent from the following detailed description and claims wherein all parts are by weight unless otherwise specified.

In accordance with one aspect of the present invention the polymerization of the vinylidene cyanide is effected in a plurality of stages with the ethylenically unsaturated organic sulfonic acid monomer being added after the first stage, i.e. after the partial polymerization of the vinylidene cyanide but before the polymerization is complete.

The invention will be further described with reference to a preferred embodiment involving polymerization of vinylidene cyanide, vinyl acetate and styrene sulfonic acid. Advantageously the polymerization is effected in a plurality of vessels, the effluent from one vessel constituting the feed for the next. In this manner it is ensured that all the vinylidene cyanide will be copolymerized. The styrene sulfonic acid is added to the effluent from that vessel where the polymerization of vinylidene cyanide is about 60 to 85% and preferably about 70 to 75% complete. The conversion is completed in the later vessels.

If the conversion is less than about 60% complete in the first vessel the product of the first stage will be a very thick slurry which is difficult to pump to the second vessel and which eventually will produce polymer that is difficult to dissolve, with attendant disadvantage, notwithstanding subsequent polymerization, drying, and other treatments.

Also, for a given ultimate composition, if conversion is less than about 60% complete or if it is more than about 85% complete before addition of the styrene sulfonic acid, the dyeability of the product will not be as great as between those values, and the fiber itself may suffer physically, e.g. be hazy.

While not wishing to be bound thereby, it is believed that the novel procedure results in a heterogeneous product which surprisingly is more dyeable. Specifically, it is believed that the product comprises two fractions. One fraction is substantially free of sulfonic acid units, constitutes about 60 to 85% by weight of the product and comprises 1:1 alternating copolymer of vinylidene cyanide-vinyl acetate; the second fraction comprises a vinylidene cyanide-vinyl acetate-styrene sulfonic acid terpolymer. This is evidenced by the fact that if the product is dissolved in acetonitrile and water is added to the extent of 35% of the acetonitrile-water total, about 75% of the product will precipitate. The precipitate apparently is the 1:1 alternating copolymer of vinylidene cyanide and vinyl acetate. The styrene sulfonic acid units remain dissolved along with some units of vinylidene cyanide and vinyl acetate; apparently these are united as a terpolymer which, due to its styrene sulfonic acid content, remains dissolved in the aqueous acetonitrile that precipitates the 1:1 copolymer.

As a further check, blending of 1:1 copolymer in the proportion precipitated from the 65–35 acetonitrile-water with terpolymer (prepared by a separate terpolymerization) containing the requisite amount of styrene sulfonic acid units to bring the overall composition to the desired value, yields a product having similar dyeability to the product of the above-described process.

For best results the styrene sulfonic acid content ranges from about 0.1 to 1 mol percent and preferably from about 0.15 to 0.4 mol percent of the product; advantageously this corresponds to about 0.2 to 2 mol percent and preferably about 0.3 to 0.6 mol percent of the vinylidene cyanide units. Advantageously the styrene sulfonic acid units are present in a fraction which constitutes about 40% and preferably about 15 to 25% of the product, i.e. the 1:1 copolymer comprises at least about 60% and preferably about 75 to 85% of the product. The sulfonic acid content of the terpolymer is thus several times higher than in the overall product which includes sulfonic acid-free polymer molecules.

In accordance with another aspect of the invention, the polymerization is carried out in at least three stages. In the first stage vinylidene cyanide and a large excess of vinyl acetate, i.e. several times the stoichiometric amount are copolymerized to at least 60% conversion of the vinylidene cyanide. In the second stage the product of the first stage is polymerized with added styrene sulfonic acid, the styrene sulfonic acid entering the polymer to exhaustion in preference to vinyl acetate. The conversion at the end of the second stage is at least about 85% and preferably at least about 90% complete. In effect, therefore, the 1:1 copolymer produced in the first stage is blended in the second stage with terpolymer, this being achieved by blending the 1:1 copolymer with precursors of the terpolymer which produce the terpolymer in the presence of the 1:1 copolymer. The third and any subsequent stages serve to complete the conversion and ensure against carry-through of any unpolymerized vinylidene cyanide.

These stages can be effected in separate vessels, each operating batchwise. Alternatively they can be effected in a single vessel, successive time intervals constituting the successive stages. The polymerizations can also proceed continuously in which event it is immaterial whether the stages constitute separate vessels or a single continuous reactor, provided the conversions are as desired, leaving each stage.

The polymerizations usually proceed in solution, a large excess of the vinyl acetate constituting solvent medium. Alternatively a different solvent medium may be employed, such as benzene or other aromatic solvent such as toluene, methyl toluene, trichlorobenzene, or the like, preferably free from impurities which initiate the ionic polymerization of the monomer, and in an amount such that the solvent comprises approximately 30 to 80% by weight of the total solution. A polymerization catalyst is included in this solution and the resulting mixture is heated to a temperature of about 30° C. to 80° C. whereupon polymerization occurs to form the desired polymer as a white powder of small particle size. The polymer thus formed may be separated from the polymerization medium simply by filtering, or if desired the polymerization medium may be removed by evaporation.

Another method of polymerization consists in agitating the monomers in a liquid aliphatic hydrocarbon (which is a non-solvent for vinylidene cyanide), for example, hexane or heptane, in the presence of a polymerization catalyst, whereupon the polymer forms and may be separated from the polymerization medium by filtering or by evaporating the medium. It is important when using this method of polymerization that the liquid aliphatic hydrocarbon be free from impurities which initiate the ionic polymerization of vinylidene cyanide.

The polymerization temperature in each stage may be as low as 0° C. or lower, or as high as 100° C. or even higher provided a catalyst is utilized which will dissociate into free radicals at the polymerization temperature. Cooling may be necessary to maintain these ranges, particularly in the first stage where considerable heat is given off. Use of refrigerated liquid monomers, however, serves to absorb this heat. Pressure may be applied to the polymerization vessel or vessels by some device such as a back pressure valve to prevent boiling of the vinyl acetate at the reaction temperature. Thus for a reaction temperature of 0° C., atmospheric pressure is sufficient; at 100° C., about 20 to 25 p.s.i.g. is needed to prevent boiling.

Conventional inhibitors may be employed to prevent premature polymerization of the monomers. Conventional polymerization catalysts may be employed, preferably a peroxygen compound such as silver peroxide, the perborates, the percarbonates, benzoyl peroxide, caproyl peroxide, lauroyl peroxide, acetone peroxide, acetyl benzoyl peroxide, cumene hydroperoxide, o,o'-dichlorobenzoyl peroxide, o,o'-dibromobenzoyl peroxide, caprylyl peroxide, pelargonyl peroxide, tertiary butyl hydroperoxide, and the like. In general, from 0.01 to 1% by weight of the catalyst is utilized, although smaller or larger amounts may be utilized if desired. By regulating the amount of the catalyst it is possible to control very accurately the molecular weight of the polymer. For instance, to obtain a high molecular weight polymer, a small quantity of catalyst is used, while low molecular weight polymers are obtained by the use of large amounts of catalyst.

The molecular weight of the preferred polymers produced in accordance with the invention usually exceeds about 10,000, advantageously exceeds about 20,000 and preferably ranges from about 25,000 to 1,000,000. The inherent viscosity of the polymer is at least about 0.5, advantageously about 1 to 3 and preferably about 1.5 to 2.5 as determined in γ-butyrolactone at 25° C.

The novel products can be converted into readily dyeable shaped structures such as castings, sheet materials or filamentary materials such as by wet, dry, or melt spinning. Suitable techniques include wet spinning of a solution of the copolymer in dimethylformamide into an aqueous coagulant in accordance with U.S. Patent 2,615,866, by wet spinning a solution of the polymer in concentrated acetonitrile into an aqueous coagulant in accordance with U.S. Patent 2,862,903, or the like. If desired, pigments, delustrants, and/or dyeability-improving additives may be present in the solution being spun.

The novel products may be dyed while still in unshaped form or they may first be shaped and subsequently dyed, as is more conventional with synthetic fibers. For further improved dyeability there may be associated with the vinylidene cyanide copolymer a polymer or copolymer of an N-substituted-acrylamide as described more fully in application Ser. No. 89,122, filed Feb. 14, 1961, in the names of Anthony B. Conciatori and Charles L. Smart, now U.S. Patent 3,180,857, issued Apr. 27, 1965, the disclosure of which is incorporated herein by reference. The preferred acrylamide is N,N-dimethyl-acrylamide and it may be added as a homopolymer or as a copolymer containing at least about 40% and preferably at least about 50% by weight of N,N-dimethyl-acrylamide. The other monomer of the copolymer may be any monoolefinic monomer such as vinyl acetate, acrylonitrile, styrene, methyl acrylate, methyl methacrylate or any of the other monomers referred to hereinafter as copolymerizable with vinylidene cyanide. The inherent viscosity of the N,N-dimethyl-acrylamide polymer, which may be prepared in any conventional manner, may vary within wide limits, e.g. from about 0.5 or less to about 3 or more and preferably from about 1 to 2.5 as measured in γ-butyrolactone at 25° C.

The N,N-dimethyl-acrylamide polymer is added to a melt or solution of the vinylidene cyanide fiber-forming polymeric mass in an amount such that there are at least about 4% of N,N-dimethyl-acrylamide based on the total weight. On the other hand, fiber properties suffer if the N,N-dimethyl-acrylamide copolymer or homopolymer is present in more than about 15% of the total weight of vinylidene cyanide copolymer and N,N-dimethyl-acrylamide polymer, i.e. about 20% of the N,N-dimethyl-acrylamide copolymer or homopolymer based on the weight of the other components.

Apparently only the N,N-dimethyl-acrylamide moiety of a copolymer thereof is effective in improving dyeability and only this should be considered in computing the amount to be added for a particular desired effect. Thus, for example, 10 parts of a 50/50 N,N-dimethyl-acrylamide/vinyl acetate copolymer contain 5 parts of N,N-dimethyl-acrylamide as do 6.7 parts of a 75/25 N,N-dimethyl-acrylamide/vinyl acetate copolymer.

The ratio of N,N-dimethyl-acrylamide to vinylidene cyanide copolymer may be varied in two ways. If a single homopolymer or copolymer of N,N-dimethyl-acrylamide is being used, the parts by weight of that material may be increased or decreased. Another way to vary the amount of N,N-dimethyl-acrylamide is to use mixtures of copolymers thereof containing different amounts of N,N-dimethyl-acrylamide by weight, but it is not desirable to use copolymers containing less than about 40 percent by weight of N,N-dimethyl-acrylamide for these materials, for these materials form solutions only with difficulty, and the fibers produced therefrom are more difficult to dye.

While the invention has been described with particular reference to 1:1 alternating vinylidene cyanide-vinyl acetate copolymers, there may also be employed copolymers of vinylidene cyanide with one or more copolymerizable monomers selected from the following classes of compounds:

(1) Vinyl esters of aliphatic monocarboxylic acids, preferably of the structure RCOOH, wherein R is alkyl, such as vinyl acetate, vinyl propionate, vinyl butyrate, vinyl enanthate and the like. The copolymerization with vinylidene cyanide of such copolymerizable monomers and the resulting copolymers are described more fully in U.S. Patent 2,615,866, issued Oct. 29, 1952.

(2) Vinyl esters of the structure

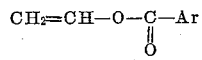

wherein Ar is an aromatic radical in which all the hydrogen atoms are attached to carbon atoms, such as vinyl benzoate; homologs of vinyl benzoate of the formula

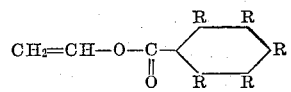

wherein each R is a member of the class consisting of hydrogen atoms or lower alkyl radicals, for example, vinyl toluate and the like; monomers of the above general class wherein the aromatic radical is halogen-substituted, such as vinyl p-chlorobenzoate, vinyl o-chlorobenzoate, vinyl m-chlorobenzoate, and similar vinyl halobenzoates, and monomers of the above general class wherein the aromatic radical is alkoxy-substituted, for example, vinyl p-methoxybenzoate, vinyl o-methoxybenzoate and vinyl p-ethoxybenzoate. The copolymerization with vinylidene cyanide, of such monomers, and the resulting copolymers are disclosed in U.S. Patent 2,615,867, issued Oct. 28, 1952.

(3) Styrene and substituted styrenes of the general formula

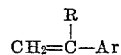

when Ar is an aromatic radical in which all of the hydrogen atoms are attached to carbon atoms and R is a member of the class consisting of hydrogen atoms and alkyl radicals, preferably those which contain from 1 to 4 carbon atoms such as styrene itself, and substituted styrenes such as alpha-methyl styrene, alpha-ethyl sytrene, alpha-butyl styrene, alpha-chlorostyrene, alpha-bromostyrene, 2,5-dichlorostyrene, 2,5-dibromostyrene, ortho-, meta-, and para-methoxystyrene, para-alpha-dimethyl styrene, paramethyl styrene, 3,4-dichlorostyrene, 3,4-difluorostyrene, 2,4-dichlorostyrene, 2,4,5-trichlorostyrene, dichloro-monofluorostyrenes and the like. Copolymerization of vinylidene cyanide with styrene and substituted styrenes is disclosed in U.S. Patent 2,615,868 issued Oct. 28, 1952.

(4) Olefins of the general structure $$CH_2=C-R$$
$$|$$
$$CH_3$$

wherein R is an alkyl radical, preferably containing from 1 to 6 carbon atoms such as isobutylene, (2-methyl propene-1), 2-methyl-butene-1, 2-methyl-pentene-1, 2,3-dimethyl-butene-1, 2,3-dimethyl-pentene-1, 2,3,3-trimethyl-butene-1, 2,3,4-trimethylpentene-1, 2,6-dimethyloctene-1, 2-methyl-nonadecene-1, and the like. Copolymeriation of such olefins with vinylidene cyanide is disclosed in U.S. Patent 2,615,865, issued Oct. 28, 1952.

(5) Alkyl esters of methacrylic acid which possess the structure

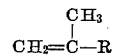

wherein R is an alkyl radical, preferably containing from 1 to 8 carbon atoms, for example, methyl methacrylate, ethyl methacrylate, propyl methacrylate, butyl methacrylate, amyl methacrylate, hexyl methacrylate, heptyl methacrylate, octyl methacrylate, decyl methacrylate, and the like. Vinylidene cyanide/alkyl methacrylate copolymers and their preparation are disclosed in U.S. Patent 2,615,871, issued Oct. 28, 1952.

(6) 2-halogenated monoolefins of the structure

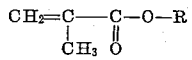

wherein R is a lower alkyl radical such as methyl, ethyl, propyl or butyl, and Y is a halogen atom, such as 2-chloropropene, 2-chlorobutene, 2-chloropentene, 2-chlorohexene, 2-chloroheptene, 2-bromobutene, 2-bromoheptene, 2-fluorohexene, 2-fluorobutene, 2-iodopropene, 2-iodopentene, and the like. Copolymerization of these compounds with vinylidene cyanide is disclosed in U.S. Patent 2,615,877, issued Oct. 28, 1952.

(7) Isopropenyl esters of organic monocarboxylic acids, preferably of the formula RCOOH, wherein R is an alkyl radical containing from 1 to 6 carbon atoms, and including isopropenyl acetate, isopropenyl propionate, isopropenyl isobutyrate, isopropenyl valerate, isopropenyl caproate, and isopropenyl enanthate; as well as isopropenyl esters of aromatic carboxylic acids, for example, isopropenyl benzoate, isopropenyl p-chlorobenzoate, isopropenyl o-chlorobenzoate, isopropenyl m-chlorobenzoate, isopropenyl toluate, isopropenyl alpha-chloroacetate, isopropenyl alpha-bromo propionate, and the like; the copolymerization of all of which with vinylidene cyanide is described in U.S. Patent 2,615,875, issued Oct. 28, 1952.

(8) Vinyl esters of alpha-halo saturated aliphatic monocarboxylic acids of the structure

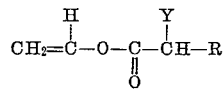

wherein R is a member of the class consisting of hydrogen and an alkyl radical, preferably a lower alkyl radical, and Y is a halogen atom such vinyl alpha-chloroacetate, vinyl alpha-bromoacetate, vinyl alpha-chloropropionate, vinyl alpha-bromopropionate, vinyl alpha-iodopropionate, vinyl alpha-bromovalerate, and the like. The copolymerization of such monomers with vinylidene cyanide is described in U.S. Patent 2,615,876, issued Oct. 28, 1952.

(9) Vinyl halides such as vinyl chloride, vinyl bromide, and the like, which are copolymerized with vinylidene cyanide as described in U.S. Patent 2,615,869, issued Oct. 29, 1952.

In addition to interpolymers of vinylidene cyanide containing the essentially 1 to 1 molar alternating structure and essentially 50 mol percent vinylidene cyanide units such as those disclosed in the patents referred to above, other vinylidene cyanide interpolymers have been described. For example, there are included interpolymers of this vinylidene cyanide content, made from vinylidene cyanide and more than one copolymerizable monoolefinic compound, at least one of which forms an essentially 1:1 alternating copolymer when copolymerized with vinylidene cyanide, a large number of which interpolymers are disclosed in U.S. Patent 2,716,106.

Among the polymerizable monoolefinic compounds which form interpolymers with vinylidene cyanide are included, by way of example, the following classes of compounds:

Monoolefinic hydrocarbons, that is, monomers containing only atoms of hydrogen and carbon such as styrene; alpha-methyl styrene; alpha-ethyl styrene; isobutylene (2-methylpropene-1); 2-methyl-butene-1; 2-methyl heptene-1; 2,3-dimethyl-hexene-1; 2,3,4-trimethyl-pentene-1; ethylene; propylene; butylene; amylene; hexylene, and the like.

Halogented monoolefinic hydrocarbons, that is, monomers containing carbon, hydrogen and one or more halogen atoms such as alpha-chlorostyrene; alpha-bromostyrene; 2,5-dichlorostyrene; 3,4-dichlorostyrene; 2,6-dichlorostyrene; dichloromonofluorostyrenes; 2-chloropropene; 2-chlorohexene; 4-fluoroheptene; 1,2-dibromoethylene; 1,2-diiodoethylene and the like.

Vinyl esters of inorganic acids such as vinyl chloride, bromoethylene, iodoethylene, and fluoroethylene.

Monoolefinically unsaturated esters such as vinyl acetate, vinyl propionate, vinyl butyrate, vinyl valerate, vinyl caproate, vinyl o-chlorobenzoate, vinyl m-chlorobenzoate and similar vinyl halobenzoates, vinyl p-methoxybenzoate, methyl methacrylate, propyl methacrylate, amyl methacrylate, octyl methacrylate and ethyl tiglate, methyl acrylate, ethyl acrylate, propyl acrylate, isopropyl acrylate, amyl acrylate, 3,5,5-trimethylhexyl acrylate and dodecyl acrylate.

Isopropenyl acetate, isopropenyl propionate, isopropenyl valerate, isopropenyl-p-chlorobenzoate, isopropenyl o-bromobenzoate, and isopropenyl alpha-bromopropionate.

Vinyl alpha-chloroacetate, vinyl alpha-bromoacetate, vinyl alpha-chloropropionate and vinyl alpha-chlorobutyrate, vinyl alpha-bromovalerate.

Allyl chloride, allyl cyanide, allyl bromide, allyl fluoride, allyl iodide, allyl nitrate, allyl thiocyanate, allyl butyrate, allyl benzoate, allyl 2,5,5-trimethyl hexoate, allyl lactate, allyl pyruvate, allyl acetoacetate, allyl thioacetate as well as methallyl esters corresponding to the above allyl esters as well as esters from such alkenyl alcohols as beta-ethyl allyl alcohol, beta-propyl allyl alcohol, and 1-buten-4-ol.

Methyl alpha-chloroacrylate, methyl alpha-bromoacrylate, ethyl alpha-chloroacrylate, propyl alpha-chloroacrylate, amyl alpha-chloroacrylate, 3,5,5-trimethyl hexyl alpha-chloroacrylate and decyl alpha-cyano acrylate.

Dimethyl maleate, diethyl maleate, dimethyl fumarate, diethyl fumarate and diethyl gluconate.

Monoolefinically unsaturated organic nitriles such as acrylonitrile, methacrylonitrile, 1,1 - dicyanopropene-1, crotononitrile, oleonitrile and the like.

Monoolefinically unsaturated carboxylic acids such as acrylic acid, methacrylic acid, crontonic acid, 3-butenoic acid, angelic acid, tiglic acid and the like.

Thus, in general the invention is applicable to resinous copolymers of vinylidene cyanide preferably containing at least about 45 mol percent of vinylidene cyanide units. Typical monoethylenically unsaturated, unsubstituted esters are those containing less than 7 carbon atoms.

The invention will be further described in the following illustrative example.

Example

A solution comprising 1 part of vinylidene cyanide in 7.7 parts of vinyl acetate and 1 part of acetic acid, and containing 0.009 part, of 2,4-dichlorobenzoyl peroxide, is introduced at 0° C. at the rate of about 10 parts per hour, into an agitated vessel containing 4.2 parts of reaction mass and maintained at 75° C. The product is continuously withdrawn, at the same rate it is introduced, as a thin slurry in which about 70% of the vinylidene cyanide is present in polymer molecules. The product is supplied along with 0.21 part per hour of a 7% solution of 40-60 ortho-, para-styrene sulfonic acid in acetic acid, to a second vessel containing 2 parts of reaction mass at 75° C. In the overflow from the second vessel about 90% of the vinylidene cyanide and about 95% of the styrene sulfonic acid units are present in polymer molecules. The overflow passes to a third vessel containing 2 parts of reaction mass maintained at 75° C. The product leaving the third vessel contains no unpolymerized styrene sulfonic acid or vinylidene cyanide. As a precaution the overflow passes to a fourth polymerizer containing 2 parts of polymerization product maintained at 75° C. All four polymerizers are under a pressure of 12 p.s.i.g. The effluent from the fourth stage is cooled to 40° C., centrifuged to 50% solids, washed with vinyl acetate, and dried at 105° C. under a nitrogen blanket. The product comprises about 80% of a 1:1 alternating vinylidene cyanide-vinyl acetate copolymer and about 20% of a vinylidene cyanide-vinyl acetate-styrene sulfonic acid terpolymer. The vinylidene cyanide constitutes 50 mol percent of the terpolymer and the vinyl acetate 48.4 mol percent; the styrene sulfonic acid constitutes 1.6 mol percent of the terpolymer, corresponding to 0.7% by weight of the whole product. The product can be dissolved in a mutual solvent along with 9% its weight of a 70–30 N,N-dimethyl-acrylamide-vinyl acetate copolymer and formed in conventional manner into filaments which are dyed uniformly, deeply and consistently with basic and/or disperse dyes.

It is to be understood that the foregoing detailed description is given merely by way of illustration and that many variations may be made therein without departing from the spirit of my invention.

Having described my invention, what I desire to secure by Letters Patent is:

1. In the copolymerization of vinylidene cyanide with an ethylenically unsaturated organic sulfonic acid and at least one additional ethylenically unsaturated monomer copolymerizable therewith, the improvement which comprises first copolymerizing said vinylidene cyanide and said additional monomer and, after said copolymerization is about 60 to 85 percent complete, introducing said sulfonic acid in an amount of about 0.2 to 2 mole percent of the vinylidene cyanide and continuing copolymerization.

2. The process of claim 1 wherein said sulfonic acid is introduced after about 70 to 75% of the vinylidene cyanide has been converted to polymer.

3. In the copolymerization of vinylidene cyanide with vinyl acetate and styrene sulfonic acid, the improvement which comprises first copolymerizing said vinylidene cyanide and vinyl acetate, and, after said vinylidene cyanide has been converted to polymer to the extent of about 60 to 85%, introducing said styrene sulfonic acid in an amount of about 0.2 to 2 mole percent of the vinylidene cyanide and continuing copolymerization until said vinylidene cyanide is substantially completely converted to polymer.

4. The process which comprises copolymerizing vinylidene cyanide with an excess of vinyl acetate until about 60 to 85% of the vinylidene cyanide has been converted to polymer, mixing the resulting reaction mixture with about 0.2 to 2% of styrene sulfonic acid based on the mols of vinylidene cyanide originally present, and continuing copolymerization until substantially all of said vinylidene cyanide and styrene sulfonic acid are converted to polymer.

5. The process which comprises contacting cooled vinylidene cyanide with a stoichiometric excess of cooled vinyl acetate and a catalyst whereby copolymerization commences, maintaining the temperature within the range of about 0 to 100° C., after about 70 to 75% of the vinylidene cyanide is consumed introducing about 0.2 to 2% of styrene sulfonic acid based on the mols of vinylidene cyanide originally present, continuing copolymerization in at least one additional stage at a temperature within the range of about 0 to 100° C. until substantially all of said vinylidene cyanide and styrene sulfonic acid are converted to polymer, cooling the resultant product, washing the cooled product with vinyl acetate, and removing unpolymerized vinyl acetate from the product.

6. A composition of matter consisting essentially of (a) about 60 to 85 parts by weight of a copolymer of vinylidene cyanide and an ethylenically unsaturated monomer copolymerizable therewith, other than an organic sulfonic acid, and (b) about 40 to 15 parts by weight of another polymer comprising vinylidene cyanide, an ethylenically unsaturated organic sulfonic acid and at least one additional ethylenically unsaturated monomer copolymerizable therewith.

7. A composition of matter according to claim 6 wherein (a) comprises a copolymer of a monoethylenically unsaturated unsubstituted ester containing fewer than about seven carbon atoms and about 45 to 55 mol percent of vinylidene cyanide.

8. A composition of matter consisting essentially of (a) about 60 to 85 parts by weight of a copolymer of vinylidene cyanide and a monoethylenically unsaturated unsubstituted ester containing fewer than about seven carbon atoms other than an organic sulfonic acid, and (b) about 40 to 15 parts by weight of another polymer comprising vinylidene cyanide, an ethylenically unsaturated organic sulfonic acid and a monoethylenically unsaturated unsubstituted ester containing fewer than about seven carbon atoms.

9. A composition of matter according to claim 8 wherein said ester comprises vinyl acetate.

10. A composition of matter according to claim 8 wherein said sulfonic acid comprises styrene sulfonic acid.

11. A composition of matter consisting essentially of (a) about 70 to 75 parts by weight of a copolymer of vinylidene cyanide and vinyl acetate in substantially alternating arrangement, and (b) about 30 to 25 parts by weight of a copolymer of vinylidene cyanide, vinyl acetate and styrene sulfonic acid, said styrene sulfonic acid constituting about 0.1 to 1 mol percent of said composition.

12. A shaped structure consisting essentially of (a)

about 60 to 85 parts by weight of a copolymer of vinylidene cyanide and an ethylenically unsaturated monomer copolymerizable therewith, other than an organic sulfonic acid, (b) about 40 to 15 parts by weight of another polymer comprising vinylidene cyanide, styrene sulfonic acid and at least one additional ethylenically unsaturated monomer copolymerizable therewith, and (c) up to about 20 parts by weight of a polymer of N,N-di(lower alkyl) acrylamide.

13. A structure in accordance with claim 12 wherein (c) is N,N-dimethyl-acrylamide.

14. A shaped structure consisting essentially of (a) about 60 to 85 parts by weight of a copolymer of vinylidene cyanide and a monoethylenically unsaturated unsubstituted ester containing fewer than about seven carbon atoms other than an organic sulfonic acid and (b) about 40 to 15 parts by weight of a copolymer of vinylidene cyanide, styrene sulfonic acid and vinyl acetate, said sulfonic acid constituting about 0.1 to 1 mol percent of (a) plus (b), and (c) up to about 20 parts by weight of a polymer of N,N-di(lower alkyl)acrylamide, the acrylamide content being at least about 40% by weight of (c) and being at least about 4 parts by weight.

15. A structure in accordance with claim 14 wherein said acrylamide is N,N-dimethyl-acrylamide.

16. A shaped structure consisting essentially of (a) about 70 to 75 parts by weight of a copolymer of vinylidene cyanide and vinyl acetate in substantially alternating arrangement, (b) about 30 to 25 parts by weight of a terpolymer of vinylidene cyanide, vinyl acetate and styrene sulfonic acid, said styrene sulfonic acid constituting about 0.1 to 1 mol percent of (a) plus (b), and (c) up to about 20 parts by weight of a polymer of N,N-dimethyl-acrylamide, the acrylamide content being at least about 40% by weight of (c) and being at least about 4 parts by weight.

References Cited

UNITED STATES PATENTS

| | | | |
|---|---|---|---|
| 2,649,434 | 8/1953 | Coover et al. | 260—898 |
| 2,773,856 | 12/1956 | Meyer et al. | 260—88.7 |
| 2,819,253 | 1/1958 | Gateff et al. | 260—78.5 |
| 2,837,501 | 6/1958 | Millhiser | 260—78.5 |
| 3,008,918 | 11/1961 | Stanton et al. | 260—898 |
| 3,133,039 | 5/1964 | Davis et al. | 260—898 |
| 3,139,621 | 6/1964 | Stewart | 260—898 |
| 3,180,857 | 4/1965 | Conciatori et al. | 260—883 |
| 3,243,415 | 3/1966 | Webb | 260—79.7 |

GEORGE F. LESMES, *Primary Examiner.*

WILLIAM H. SHORT, MURRAY TILLMAN, *Examiners.*

N. W. SHUST, *Assistant Examiner.*